United States Patent
Bos (10) Patent No.: US 9,622,397 B2
(45) Date of Patent: Apr. 18, 2017

(54) AERATING DEVICE

(71) Applicant: Redexim Handel-en Exploitatie Mij. B.V., Zeist (NL)

(72) Inventor: Anton Cornelis Bos, Doorn (NL)

(73) Assignee: Redexim Handel-en Exploitatie Mij. BV, Zeist (NL)

( * ) Notice: Subject to any disclaimer, the term of this patent is extended or adjusted under 35 U.S.C. 154(b) by 0 days.

(21) Appl. No.: 14/440,421

(22) PCT Filed: Nov. 6, 2013

(86) PCT No.: PCT/NL2013/050792
§ 371 (c)(1),
(2) Date: May 4, 2015

(87) PCT Pub. No.: WO2014/073958
PCT Pub. Date: May 15, 2014

(65) Prior Publication Data
US 2015/0271983 A1     Oct. 1, 2015

(30) Foreign Application Priority Data

Nov. 6, 2012   (NL) ..................... 2009765

(51) Int. Cl.
*A01B 45/02* (2006.01)
*A01B 33/08* (2006.01)

(52) U.S. Cl.
CPC ............ *A01B 45/02* (2013.01); *A01B 33/082* (2013.01); *A01B 45/026* (2013.01); *Y10T 29/49815* (2015.01)

(58) Field of Classification Search
CPC ....... A01B 33/082; A01B 45/00; A01B 45/02; A01B 45/023; A01B 45/026; A01B 33/028
See application file for complete search history.

(56) References Cited

U.S. PATENT DOCUMENTS

| 5,101,911 A | * | 4/1992 | Lee | ........................... E01H 5/04 172/113 |
| 5,142,852 A | * | 9/1992 | Nelson | ................... A01D 43/02 172/21 |
| 5,224,552 A | | 7/1993 | Lee et al. | |

(Continued)

FOREIGN PATENT DOCUMENTS

| DE | 3524752 A1 | 1/1987 |
| GB | 420050 A | 11/1934 |
| GB | 939364 A | 10/1963 |

*Primary Examiner* — Jamie L McGowan
(74) *Attorney, Agent, or Firm* — Rudy J. Ng; Bret E. Field; Bozicevic, Field & Francis LLP (57) ABSTRACT

An aerating device includes a frame, moving means arranged on the frame for moving the aerating device in a direction of movement over a ground surface for working, a drive, a rotor shaft provided with a plurality of knives, where the rotor shaft is arranged bearing-mounted between the frame and the drive and is operatively coupled to the drive for rotating the rotor shaft, and where the knives are inserted successively into the around surface, and where during uncoupling of the rotor shaft and the drive the rotor shaft is movable in a direction away from the drive such that the rotor shaft lies at a distance from the drive.

15 Claims, 6 Drawing Sheets

(56) References Cited

U.S. PATENT DOCUMENTS

| | | | | |
|---|---|---|---|---|
| 5,353,881 A | * | 10/1994 | Lee | A01B 33/028 172/113 |
| 6,488,101 B1 | * | 12/2002 | Miyahara | A01B 33/028 172/351 |
| 8,899,005 B2 | * | 12/2014 | Pavlich | A01G 1/12 56/249 |
| 2006/0243463 A1 | | 11/2006 | Mensch | |

* cited by examiner

AERATING DEVICE

The present invention relates to an aerating device for a ground, comprising:
a frame;
moving means arranged on the frame for the purpose of moving the aerating device in a direction of movement over a ground surface for working;
a drive;
a rotor shaft provided with a plurality of knives, wherein the rotor shaft is arranged bearing-mounted between the frame and the drive, wherein the rotor shaft is operatively coupled to the drive for the purpose of rotating the rotor shaft, wherein the knives are inserted successively into the ground surface.

The invention further relates to a method for uncoupling a rotor shaft from a drive.

For the purpose of aerating a ground, particularly a ground provided with a grass cover, it is known to arrange slits in this ground using an aerating device provided with a rotor shaft on which knives are arranged. As the device advances over the ground the knives arranged on the rotating shaft are carried successively into the ground and form slits therein. Such slits have a positive effect on the grass cover.

Such a device is usually arranged behind a tractive vehicle and is provided for this purpose with suitable connecting means in the form of for instance a three-point suspension. The drive of the aerating device is configured here to receive a power take-off of the tractive vehicle. The drive is provided with a suitable transmission for rotating the rotor shaft.

The drive, for instance in the form of a gearbox, is generally located in the centre of the aerating device as seen in a direction transversely of the direction of movement, wherein rotor shafts are arranged on both sides of the drive. The drive usually comprises for this purpose two shafts provided with flanges, wherein the flanges are provided with threaded ends to which flanges of the rotor shafts are coupled using nuts.

The rotor shaft is rotated at high speed so that the forces on the rotor shaft are also great. It is not therefore unusual for a rotor shaft to be damaged, for instance by a rock in the ground. The drive itself is also susceptible to wear, wherein the gaskets have been found to be particularly critical components.

Making the drive accessible or removing the rotor shaft is however a time-consuming operation in which the whole assembly of rotor shaft and drive is taken out of the aerating device. The assembly is re-placed following maintenance.

It is an object of the present invention, among others, to provide an aerating device which can be serviced in simpler and/or more efficient manner.

The aerating device of the type stated in the preamble has for this purpose the special feature that, during uncoupling of the rotor shaft and the drive, the rotor shaft is movable in a direction away from the drive such that the rotor shaft lies at a distance from the drive. Other than in known aerating devices in which the rotor shaft is arranged without appreciable play between the frame, particularly a vertically extending wall part thereof, and the drive, in the aerating device according to the invention the rotor shaft can be displaced away from the drive. This movement of the rotor shaft away from the drive, preferably in the axial direction of the rotor shaft, enables easy access to the drive for maintenance purposes. In this maintenance mode the rotor shaft lies clear of the drive, i.e. they do not make contact. In particular threaded ends optionally arranged on the flange of the drive shaft of the drive are then no longer in contact with a connecting flange of the rotor shaft.

In order to create sufficient space for this purpose, the rotor shaft is preferably movable over a distance of at least 4 cm in the direction away from the drive. This distance is more preferably about 4 cm, more preferably about 8 cm.

According to a preferred embodiment, the frame is provided with a passage for receiving the rotor shaft during the movement of the rotor shaft away from the drive. A rotor shaft, which has at least the same length as the distance between the frame and the drive, is hereby provided with space so that it can be moved away from the drive. The bearing with which the rotor shaft is arranged bearing-mounted on the frame is preferably aligned with the passage. The rotor shaft can for instance extend here through the bearing and the opening when maintenance is necessary. A compact assembly is achieved when the bearing is arranged on the inner side of the frame.

In order to enable removal of the rotor shaft from the aerating device it is advantageous for the opening to comprise a slot in a wall of the frame, wherein the slot debouches into a side edge, in particular the lower edge, of the wall. The rotor shaft can now be guided through the slot to a side edge so that it can be taken out.

According to a further preferred embodiment, the aerating device also comprises a coupling element coupled releasably to the rotor shaft between the drive and the frame such that the rotor shaft is movable in the direction away from the drive after uncoupling of the coupling element. After the coupling element is released there is then sufficient space to move the rotor shaft away from the drive, while in the operative mode the coupled coupling element preferably provides for enclosing of the rotor shaft in axial direction between the drive and the frame. In other words, in coupled state the coupling element preferably limits a movement of the rotor shaft in axial direction away from the drive.

A simple assembly is obtained when the coupling element comprises the bearing. The bearing can for instance be provided with an end plate which limits movement of the rotor shaft through the bearing. The movement in axial direction is then possible following removal of the bearing.

It is possible here for the rotor shaft to extend in the operative mode through the opening in the frame, and wherein the bearing is arranged on the outer side of the frame and is coupled to the end of the rotor shaft protruding through the opening. After the bearing has been uncoupled from the frame, the rotor shaft with bearing can be moved. The bearing can be provided here with a flange with which the bearing is connected to the frame, in particular a vertical side wall thereof.

According to a further preferred embodiment, the coupling element comprises a filler plate arranged between the frame and the bearing. The filler plate is preferably arranged on the inner side of the frame, in particular on a vertical side wall thereof. Movement of the rotor shaft in axial direction between the bearing and the drive is limited in coupled state, although after removal of the filler plate the rotor shaft with bearing can move away from the drive through a distance corresponding to the thickness of the filler plate. The filler plate therefore preferably has a thickness of at least 4 cm. It is advantageous here for the rotor shaft to have a length smaller than the distance between the drive and the frame so that, after removal of the filler plate, the rotor shaft can be taken out of the aerating device.

In order to provide a simple coupling and uncoupling, the coupling element is preferably connected with bolts and nuts to the frame. In the case of the filler plate it is particularly advantageous for the filler plate to comprise holes which coincide with the connecting holes for the bearing. The frame, in particular a vertical side wall thereof, is then also provided with corresponding, coinciding connecting holes. Bolts are then arranged through the frame, the filler plate and the bearing, for instance a flange thereof, and are connected using nuts.

According to a further preferred embodiment, the rotor shaft is constructed from at least two rotor shaft parts mutually coupled in the axial direction of the rotor shaft, wherein at least one of the rotor shaft parts forms the coupling element. By removing one of the rotor shaft parts sufficient space is created for moving the remaining part of the rotor shaft. It is also advantageous here for the remaining part of the rotor shaft to be easily removable from the aerating device.

The invention also relates to a method for uncoupling a rotor shaft from a drive of an aerating device according to the invention, comprising the steps of:
uncoupling the rotor shaft from the drive; and
moving the rotor shaft away from the drive in axial direction.

During movement of this rotor shaft in axial direction of the rotor shaft the rotor shaft can for instance be inserted into the frame through the bearing and through the opening. The drive is easily accessible for maintenance here.

It is however also possible, as already discussed above, for the method to also comprise the step of uncoupling a coupling element, wherein the rotor shaft is movable in the axial direction away from the drive after the uncoupling.

The present invention is further illustrated with reference to the following figures, which show a preferred embodiment of the device according to the invention and are not intended to limit the scope of the invention in any way, wherein.

Figure 1:
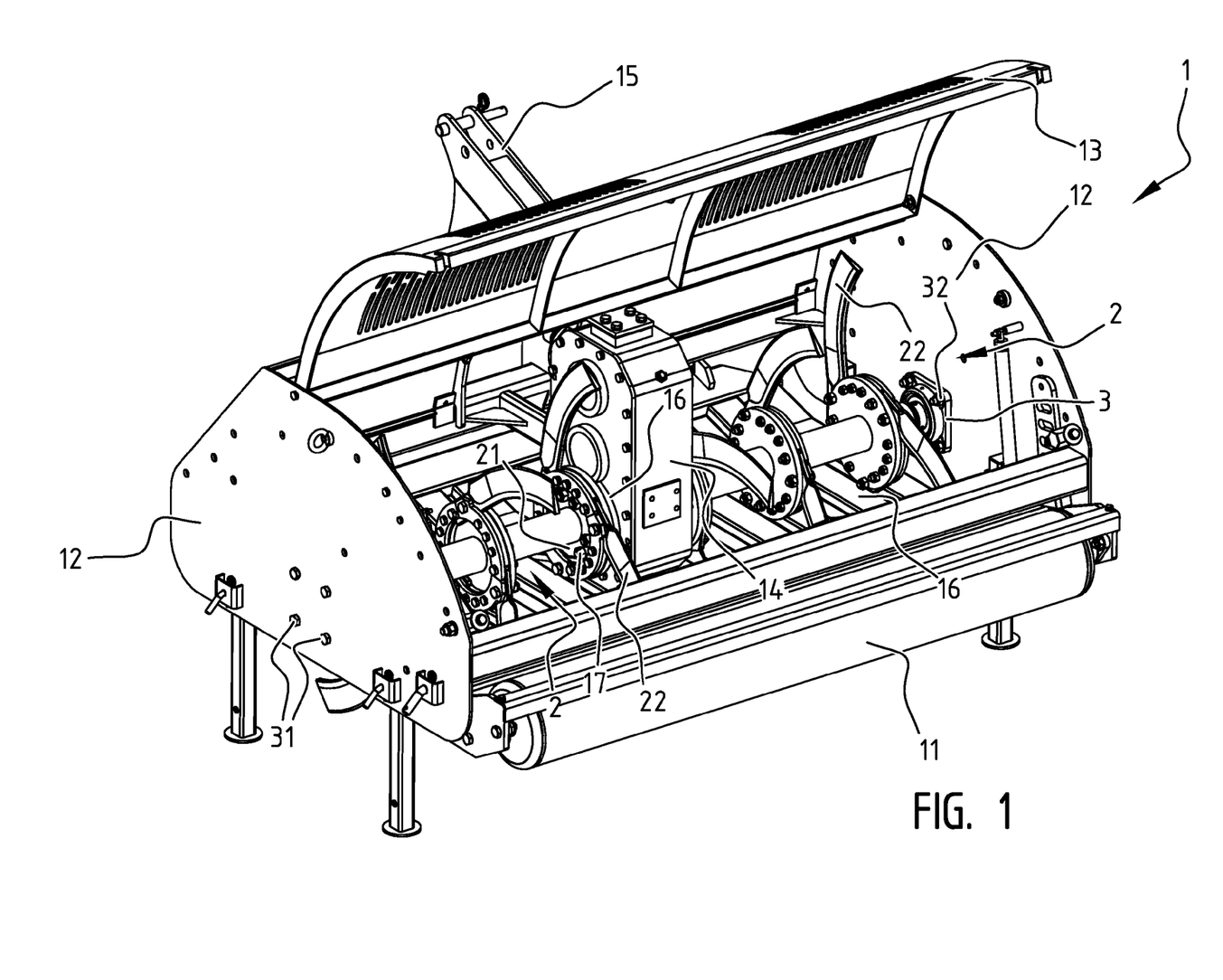
FIG. 1 is a perspective view of an aerating device.

FIG. 1 shows an aerating device 1 provided with a frame 16, moving means embodied as travel roller 11 and a drive embodied as transmission 14 in which a power take-off of a tractive vehicle can be arranged. Device 1 can be connected to a tractive vehicle using an attachment 15.

Connected to both sides of transmission 14 are rotor shafts 2 on which knives 22 are arranged. For the purpose of connecting rotor shafts 2 the drive 14 is provided on both sides with flanges 16 with threaded ends 18 (see for instance FIG. 2a). Flanges 21 of rotor shafts 2 are arranged on these flanges 16 using nuts 17.

The other outer end of a rotor shaft 2 is connected to a side wall 12 of frame 16 using a bearing 3. Bearing 3 is connected here with bolts 31 and nuts 32. Rotor shafts 2 are enclosed here between bearings 3 and drive 14. Device 1 is also provided with a housing in which a hatch 13 is arranged. Opening the hatch 13 makes rotor shaft 2 accessible, for instance for the purpose of replacing components of rotor shaft 2.

Figure 2A:
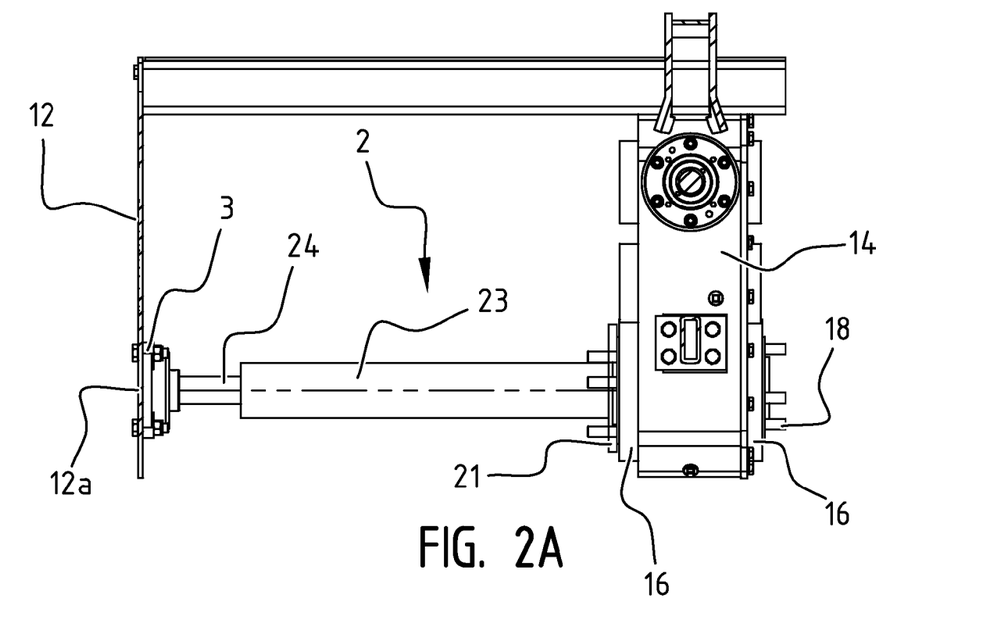
FIGS. 2a,b-6a,b show different variants of the aerating device according to the invention.
Figure 2B:
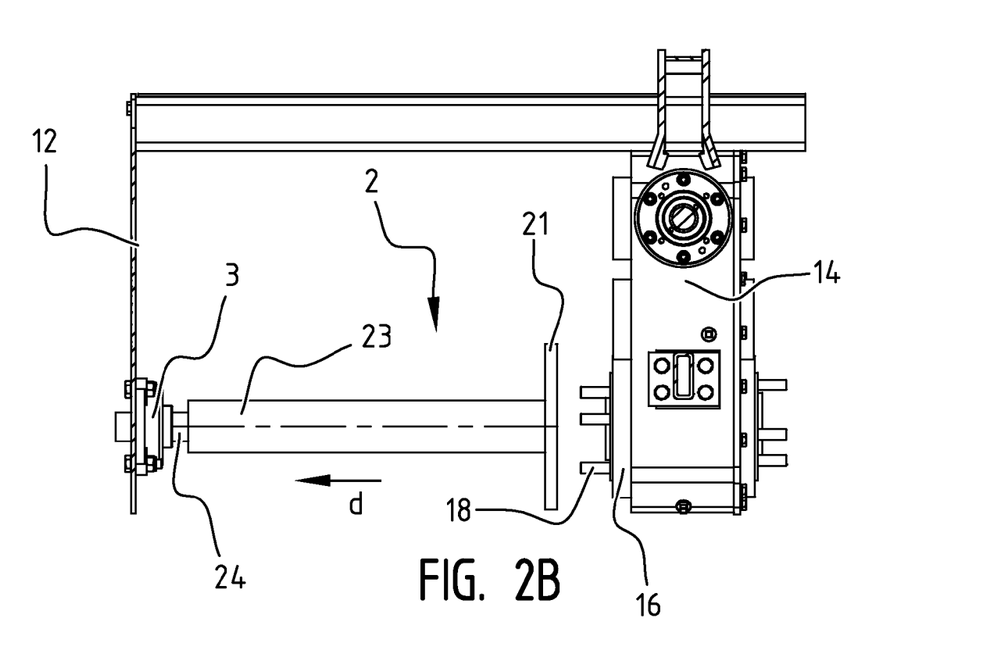

FIGS. 2a and 2b show a top view of a first embodiment of aerating device 1 according to the invention. In FIG. 2a aerating device 1 is in the operative mode, wherein rotor shaft 2 lies enclosed between side wall 12 and drive 14. In order to replace a gasket of drive 14 the rotor shaft 2 can be pushed in a direction d away from drive 14 after the nuts have been uncoupled from threaded ends 18. An end part 24 narrowed relative to a middle part 23 protrudes here through an opening 12a in side wall 12 and bearing 3, see FIG. 2b. Bearing 3 is aligned here with opening 12. Rotor shaft 2 is movable in the direction d such that threaded ends 18 lie clear of flange 21 of rotor shaft 2.

Figure 3A:
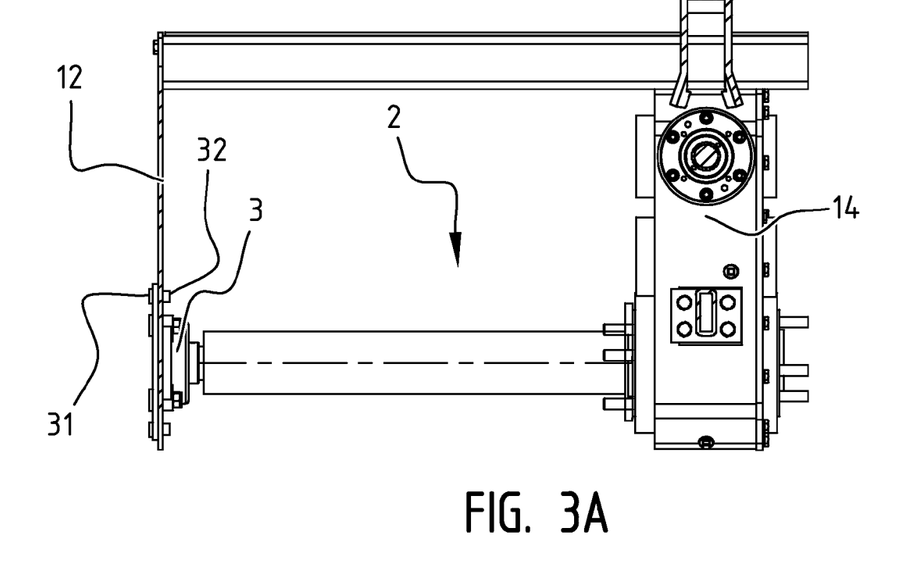
Figure 3B:
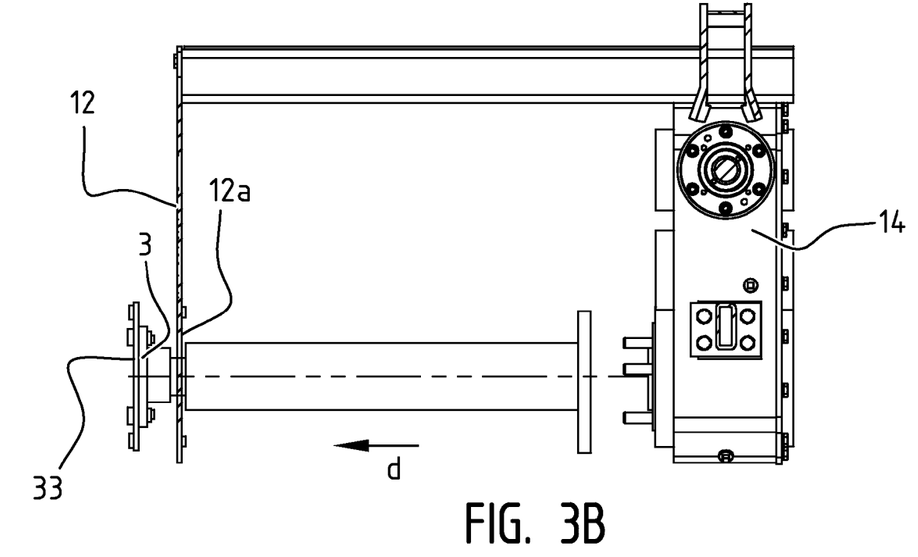

FIGS. 3a and 3b show an alternative, wherein bearing 3 is coupled to the outer side of side wall 12 with bolts 31 and nuts 32 using plate 33. In the operative mode as shown in FIG. 3a the bearing 3 protrudes through an opening 12a in this wall 12. When rotor shaft 2 has to be uncoupled from drive 14, nuts 32 are removed so that the assembly of rotor shaft 2 with the bearing 3 arranged on the outer end can be moved in a direction d through opening 12a.

Figure 4A:
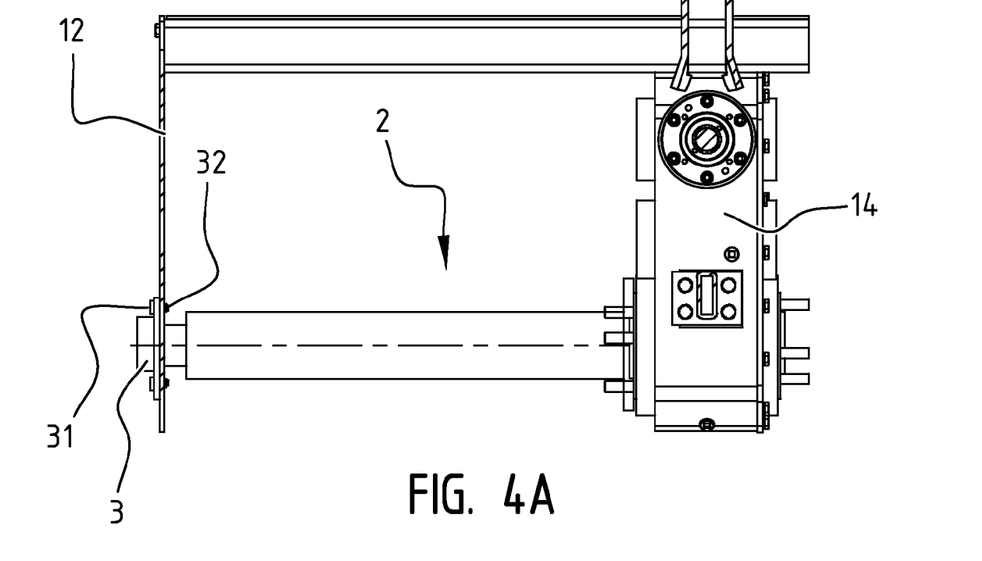
Figure 4B:
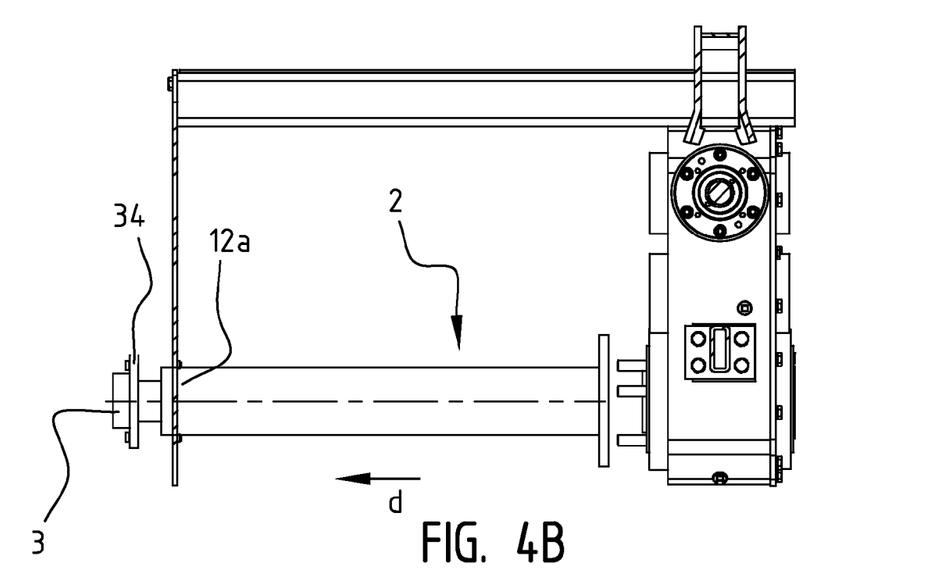

A variant hereof is shown in FIGS. 4a and 4b, wherein bearing 3 is provided with a flange 34 with a centering ring which fits into opening 12a in wall 12. Bearing 3 is arranged on the outer side of wall 12. After bolts 32 are removed, rotor shaft 2 can be moved with bearing 3 in a direction d away from drive 14.

Figure 5A:
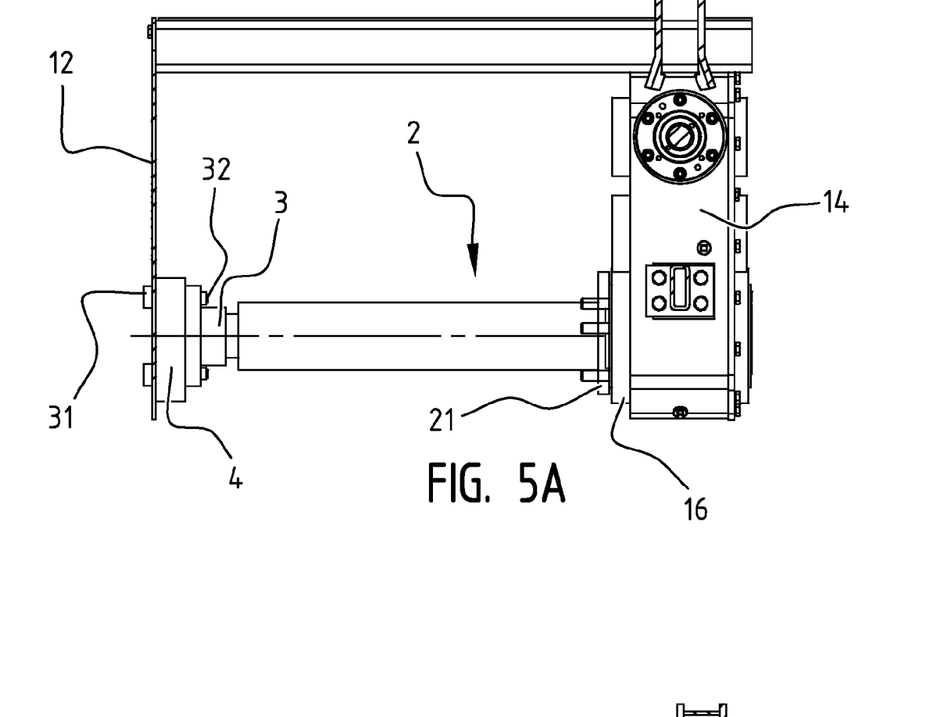
Figure 5B:
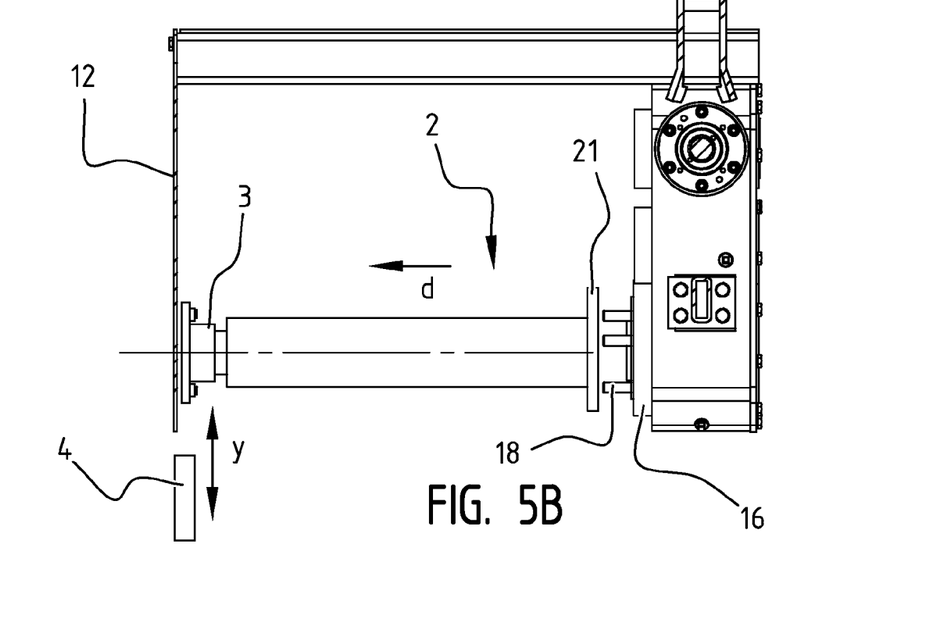

In the variant of FIGS. 5a and 5b use is made of a combination of bearing 3 with rotor shaft 2 which has a length shorter than the distance between wall 12 and flange 16 of drive 14. In order to keep rotor shaft 2 stable in the operative mode as shown in FIG. 5a the bearing 3 is arranged on wall 12 using a filler plate 4. Filler plate 4 is provided for this purpose with connecting holes which coincide with the connecting holes in wall 12 and bearing 3, so that bolts 31 can be placed through these holes and nuts 32 are arranged thereon. After nuts 32 have been removed the filler plate 4 can be removed, as indicated with y in FIG. 5b. After uncoupling of flange 21 of rotor shaft 2 and flange 16 of the drive the rotor shaft 2 can be moved in direction d. The distance over which rotor shaft 2 can be displaced corresponds here to the thickness of filler plate 4 and is in this embodiment 4 cm. This is enough to create sufficient distance between threaded ends 18 and flange 21 of rotor shaft 2 so that rotor shaft 2 with bearing 3 can be taken as a whole out of the aerating device.

Figure 6A:
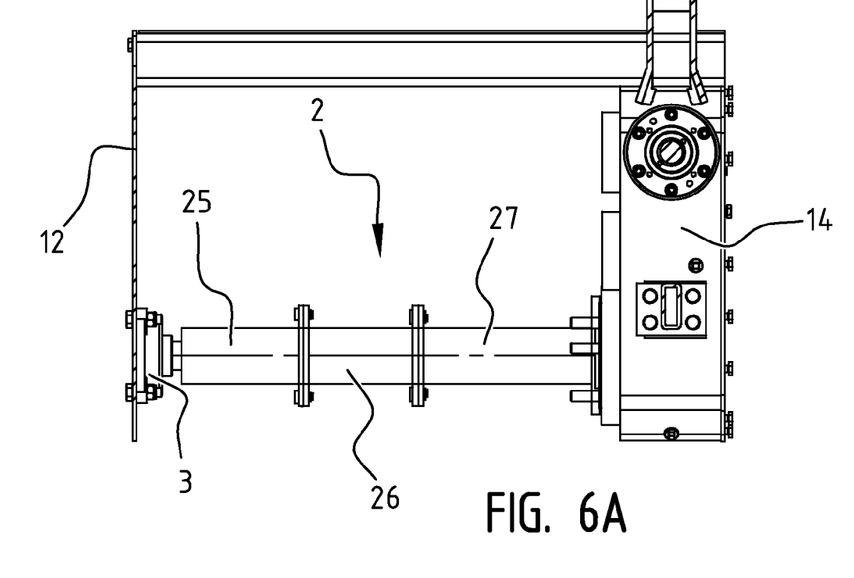
Figure 6B:
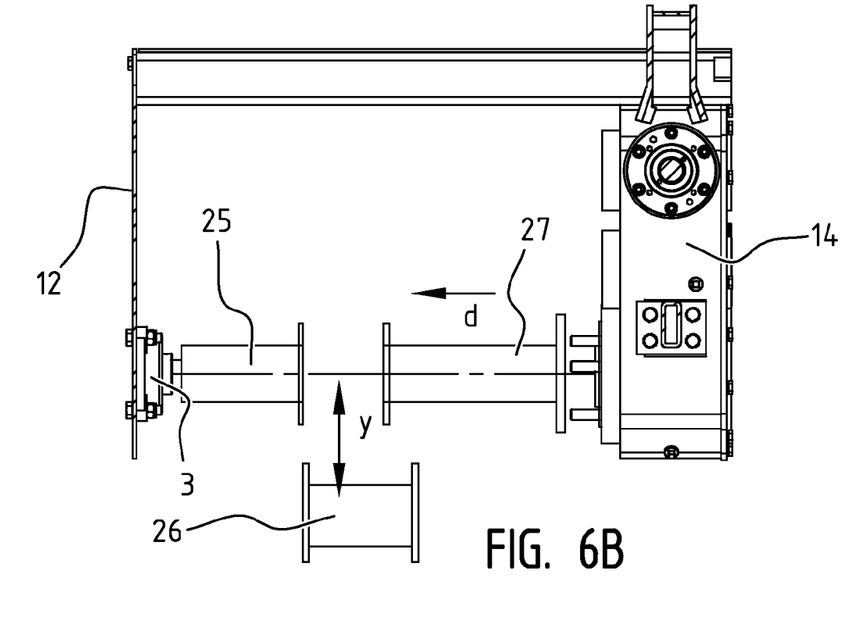

Rotor shaft 2 of the variant as shown in FIGS. 6a and 6b can also be taken out of the aerating device. Rotor shaft 2 is constructed for this purpose from parts 25, 26 and 27 which are mutually connected using flanges and bolts and nuts in the operative mode as shown in FIG. 5a. When rotor shaft 2 has to be uncoupled, a middle part 26 is removed from rotor shaft 2 (indicated with y in FIG. 6b) so that there is sufficient space to move rotor shaft part 27 in a direction d away from drive 14. Parts 25 and 27 can then also be removed from the device.

The present invention is not limited to the shown embodiments but also extends to other embodiments falling within the scope of the appended claims.

The invention claimed is:
1. An aerating device for a ground, the device comprising:
a frame;
moving means arranged on the frame for the purpose of moving the aerating device in a direction of movement over a ground surface for working;
a drive; and
a rotor shaft provided with a plurality of knives, wherein the rotor shaft is arranged bearing-mounted between the frame and the drive, wherein the rotor shaft is operatively coupled to the drive for the purpose of rotating the rotor shaft, wherein the knives are inserted successively into the ground surface,
wherein, during uncoupling of the rotor shaft from the drive, the rotor shaft with the knives is movable with respect to the frame in an axial direction of the rotor shaft away from the drive such that the rotor shaft lies clear at a distance from the drive.

2. The aerating device as claimed in claim 1, wherein the rotor shaft is movable over a distance of at least 4 cm in the direction away from the drive.

3. The aerating device as claimed in claim 1, wherein the frame is provided with an opening for receiving the rotor shaft during the movement of the rotor shaft away from the drive, wherein the bearing with which the rotor shaft is arranged bearing-mounted on the frame is aligned with the passage.

4. The aerating device as claimed in claim 3, wherein the opening comprises a slot in a wall of the frame, wherein the slot debouches into a side edge of the wall.

5. The aerating device as claimed in claim 1, wherein the aerating device also comprises a coupling element coupled releasably to the rotor shaft between the drive and the frame such that the rotor shaft is movable in the direction away from the drive after uncoupling of the coupling element.

6. The aerating device as claimed in claim 3, wherein the coupling element comprises the bearing.

7. The aerating device as claimed in claim 6, wherein the rotor shaft extends in the operative mode through the opening in the frame, and wherein the bearing is arranged on the outer side of the frame and is coupled to the end of the rotor shaft protruding through the opening.

8. The aerating device as claimed in claim 5, wherein the coupling element comprises a filler plate arranged between the frame and the bearing.

9. The aerating device as claimed in claim 2, wherein the filler plate has a thickness of at least 4 cm.

10. The aerating device as claimed in claim 5, wherein the coupling element is connected with bolts and nuts to the frame.

11. The aerating device as claimed in claim 5, wherein the rotor shaft is constructed from at least two rotor shaft parts mutually coupled in the axial direction of the rotor shaft, wherein at least one of the rotor shaft parts forms the coupling element.

12. A method for uncoupling a rotor shaft from a drive of an aerating device as claimed in claim 1, comprising the steps of:
    uncoupling the rotor shaft from the drive; and
    moving the rotor shaft with respect to the frame away from the drive in axial direction of the rotor shaft.

13. The aerating device as claimed in claim 1, wherein the drive comprises a drive flange comprising threaded ends and the rotor shaft comprises a rotor shaft flange for operatively coupling the rotor shaft to the drive.

14. The aerating device as claimed in claim 1, wherein the drive is located in the center of the aerating device between side walls of the frame.

15. The aerating device as claimed in claim 14, further comprising a second rotor shaft provided with a plurality of knives, wherein the rotor shaft is operatively coupled to a first side of the drive and the second rotor shaft is operatively coupled to a second side of the drive.

* * * * *